US010282776B2

United States Patent
Jo et al.

(10) Patent No.: US 10,282,776 B2
(45) Date of Patent: May 7, 2019

(54) USER EQUIPMENT FOR RECOGNIZING OBJECT AND DISPLAYING DATABASE MATCHING RESULT, CONTROL METHOD THEREOF AND NON-TRANSITORY COMPUTER READABLE STORAGE MEDIUM HAVING COMPUTER PROGRAM RECORDED THEREON

(71) Applicant: SK Planet Co., Ltd., Gyeonggi-do (KR)

(72) Inventors: Eun Byul Jo, Seoul (KR); Hyoung Seok Kim, Gyeonggi-do (KR); Sung Bin Kim, Gyeonggi-do (KR); Hwan Won Choi, Seoul (KR); Tae Yong Kim, Seoul (KR)

(73) Assignee: SK PLANET CO., LTD., Seongnam-si, Gyeonggi-do (KR)

( * ) Notice: Subject to any disclaimer, the term of this patent is extended or adjusted under 35 U.S.C. 154(b) by 682 days.

(21) Appl. No.: 14/954,803

(22) Filed: Nov. 30, 2015

(65) Prior Publication Data

US 2016/0364788 A1 Dec. 15, 2016

(30) Foreign Application Priority Data

Jun. 9, 2015 (KR) .................. 10-2015-0081092

(51) Int. Cl.
| | | |
|---|---|---|
| G06Q 30/00 | (2012.01) |
| G06Q 30/06 | (2012.01) |
| H04N 5/232 | (2006.01) |
| G06K 9/78 | (2006.01) |
| G06T 19/00 | (2011.01) |
| H04B 5/00 | (2006.01) |
| G06Q 20/12 | (2012.01) |
| G06Q 20/32 | (2012.01) |

(52) U.S. Cl.
CPC .......... *G06Q 30/0635* (2013.01); *G06K 9/78* (2013.01); *G06Q 20/12* (2013.01); *G06Q 20/3278* (2013.01); *G06T 19/006* (2013.01); *H04B 5/0062* (2013.01); *H04N 5/23203* (2013.01)

(58) Field of Classification Search
CPC .......................................... G06Q 30/06–30/08
USPC ................................................ 705/26.1–27.2
See application file for complete search history.

(56) References Cited

U.S. PATENT DOCUMENTS

| | | | | |
|---|---|---|---|---|
| 2011/0145093 A1* | 6/2011 | Paradise | ................ | G06Q 30/02 |
| | | | | 705/26.41 |
| 2011/0246328 A1* | 10/2011 | Dunwoody | ............ | G06Q 20/10 |
| | | | | 705/27.1 |
| 2013/0143603 A1* | 6/2013 | DiAcetis | ................ | H04W 4/043 |
| | | | | 455/456.6 |

FOREIGN PATENT DOCUMENTS

KR  2009-0026372 A  3/2009

* cited by examiner

*Primary Examiner* — Ethan D Civan
(74) *Attorney, Agent, or Firm* — Fenwick & West LLP

(57) ABSTRACT

Provided are an user equipment for recognizing an object and displaying a database matching result, a control method thereof, and a non-transitory computer readable storage medium having a computer program recorded thereon. That is, the present invention provides assistance on a purchase decision-making of a user by sensing an object as quickly as possible and providing information about the object to the user, and also improves convenience of the user through integrated UX.

10 Claims, 8 Drawing Sheets

USER EQUIPMENT FOR RECOGNIZING OBJECT AND DISPLAYING DATABASE MATCHING RESULT, CONTROL METHOD THEREOF AND NON-TRANSITORY COMPUTER READABLE STORAGE MEDIUM HAVING COMPUTER PROGRAM RECORDED THEREON

CROSS-REFERENCE TO RELATED APPLICATION

This application claims the benefit of Korean Application No. 10-2015-0081092 filed on Jun. 9, 2015 with the Korean Intellectual Property Office, the disclosure of which is incorporated herein by reference.

BACKGROUND OF THE INVENTION

1. Field of the Invention

The present invention relates to a user equipment for recognizing an object and displaying a database matching result, a control method thereof, and a non-transitory computer readable storage medium having a computer program recorded thereon, and more particularly, to a user equipment for recognizing an object and displaying a database matching result which provides assistance on a purchase decision-making of a corresponding user by sensing the object as quickly as possible and providing information about the object to the user, a control method thereof, and a non-transitory computer readable storage medium having a computer program recorded thereon.

2. Description of the Related Art

Examples of a method for recognizing an object may include image recognition, text recognition (OCR), QR code recognition, and the like.

Such object recognition methods can be used to simply recognize an object and display information about the recognized object.

PATENT DOCUMENT

Korean Patent Laid-open Publication No. 10-2009-0026372 [entitled "System and method for extracting product information in video communication"]

SUMMARY OF THE INVENTION

An object of the present invention is to provide a user equipment for recognizing an object and displaying a database matching result which senses the object as quickly as possible and provides information about the object to a user, a control method thereof, and a non-transitory computer readable storage medium having a computer program recorded thereon.

Another object of the present invention is to provide a user equipment for recognizing an object and displaying a database matching result which provides a plurality of recognition methods, such as image recognition, text recognition, bar code recognition, QR code recognition, receipt of information through a beacon, and recognition of information by NFC tagging, through a single solution, a control method thereof, and a non-transitory computer readable storage medium having a computer program recorded thereon.

Yet another object of the present invention is to provide a user equipment for recognizing an object and putting a product corresponding to the recognized object in a shopping cart or a wish list at the same time, a control method thereof, and a non-transitory computer readable storage medium having a computer program recorded thereon.

According to an aspect of the present invention, a user equipment includes: a storage unit configured to store a plurality of recognition methods and product information for each object; a photographing unit configured to be switched on by the control of a control unit when an object recognition function is executed, and photographs image information; a communication unit configured to be switched on by the control of the control unit, and also configured to receive a beacon signal transmitted from a beacon adjacent to the user equipment including the photographing unit, checking first tagging information by NFC tagging on an NFC tag adjacent to the user equipment, or checking second tagging information by tagging on an RFID tag adjacent to the user equipment; the control unit configured to check information priorly received from the photographing unit and the communication unit which are switched on, recognize the object on the basis of the priorly received information, check product information corresponding to the recognized object among the product information for each object previously stored in the storage unit, and add the checked product information to a preset shopping cart or wish list; and a display unit configured to display one of the image information photographed by the photographing unit, an object recognized according to an analysis result of the beacon signal, an object recognized by analyzing the first tagging information, and an object recognized by analyzing the second tagging information on one side, and display product information corresponding to the recognized object on the other side.

In an embodiment of the present invention, the priorly received information may be any one of the image information photographed by the photographing unit, the beacon signal received through the communication unit, the first tagging information checked by the communication unit by NFC tagging, and the second tagging information checked by the communication unit by RFID tagging.

In an embodiment of the present invention, when the image information photographed by the photographing unit is priorly received, the control unit analyzes an attribute of an object included in the image information by unit of pattern, determines a single or a plurality of recognition methods corresponding to a pattern analysis result among the plurality of recognition methods stored in the storage unit on the basis of the pattern analysis result, and recognizes the object included in the image information on the basis of the single determined recognition method or recognizes the object included in the image information by performing the plurality of determined recognition methods in sequence or recognizes the object included in the image information by performing the plurality of determined recognition methods in parallel.

In an embodiment of the present invention, when the beacon signal transmitted from the beacon is received by the communication unit, the control unit analyzes information included in the beacon signal and identifies an object according to an analysis result.

In an embodiment of the present invention, when the first tagging information of NFC tagging or second tagging information of RFID tagging is received by the communication unit, the control unit analyzes the first tagging information or the second tagging information and identifies an object according to an analysis result.

In an embodiment of the present invention, the product information may include at least one of a product name, a product identity code, a product image, a product specification, location information of a store that sells a corresponding product, a telephone number of the store, and location information of stores located within a preset radius of a location of the user equipment.

In an embodiment of the present invention, the display unit displays product information corresponding to the recognized object by using an augmented reality (AR) function or overlay function by the control of the control unit, and may display only information with a preset highest priority among information included in the product information.

According to another aspect of the present invention, a control method of a service providing device includes: switching on a photographing unit and a communication unit by the control of a control unit when an object recognition function is executed; recognizing, by the control unit, an object on the basis of priorly received information among image information photographed by the photographing unit, a beacon signal received by the communication unit, first tagging information of NFC tagging checked by the communication unit, and second tagging information of RFID tagging checked by the communication unit; checking, by the control unit, product information corresponding to the recognized object among product information for each object previously stored in a storage unit and adding the checked product information to a preset shopping cart or wish list; and displaying, by a display unit, one of the image information photographed by the photographing unit, an object recognized according to an analysis result of the beacon signal, an object recognized by analyzing the first tagging information, and an object recognized by analyzing the second tagging information on one side, and display product information corresponding to the recognized object on the other side.

In an embodiment of the present invention, the control method of a service providing device may further include: displaying, by the display unit, a shopping cart screen or a wish list screen to which the product information is added when a preset shopping cart item or wish list item displayed on the display unit is selected; executing, by the control unit, a payment function with respect to the product corresponding to product information added to the shopping cart screen or the wish list screen by interworking with a payment server when a preset purchase button displayed on the display unit is selected; and displaying, by the display unit, a payment function execution result.

According to yet another aspect of the present invention, a computer program for executing the control method according to the aforementioned embodiment may be stored in a non-transitory computer readable storage medium having a computer program recorded thereon.

As described above, according to the present invention, it is possible to provide assistance on a purchase decision-making of a user by sensing an object as quickly as possible and providing information about the object to the user, and also possible to improve convenience of the user through integrated UX.

Further, it is possible to simply and quickly recognize an object by a recognition method optimized for a specific object by providing a plurality of recognition methods, such as image recognition, text recognition, bar code recognition, QR code recognition, receipt of information through a beacon, and recognition of information by NFC tagging, through a single solution, and thus possible to improve satisfaction of a user.

Further, it is possible to provide a seamless shopping experience from recognition to result checking and purchase by recognizing an object and putting a product corresponding to the recognized object in a shopping cart or a wish list at the same time, and thus possible to improve convenience of a user.

DETAILED DESCRIPTION OF THE PREFERRED EMBODIMENTS

Figure 1:
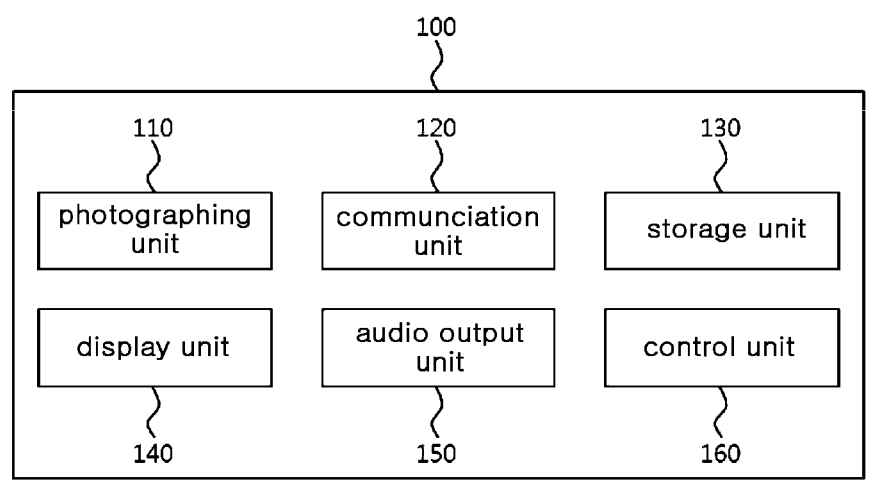
FIG. 1 is a block diagram illustrating a configuration of a user equipment according to an embodiment of the present invention.

It is noted that technical terms used in the present invention are used to just describe a specific embodiment and do not intend to limit the present invention. Further, if the technical terms used in the present invention are not particularly defined as other meanings in the present invention, the technical terms should be appreciated as meanings generally appreciated by those skilled in the art and should not be appreciated as excessively comprehensive meanings or excessively reduced meanings. Further, when the technical term used in the present invention is a wrong technical term that does not accurately express the spirit of the present invention, the technical term should be understood by being substituted by a technical term which can be correctly understood by those skilled in the art. In addition, a general term used in the present invention should be interpreted as defined in a dictionary or contextually, and should not be interpreted as an excessively reduced meaning.

In addition, singular expressions used in the present invention include plurals expressions unless they have definitely opposite meanings. In the present invention, it should not analyzed that a term such as "comprising" or "including" particularly includes various components or various steps disclosed in the specification and some component or some steps among them may not be included or additional components or steps may be further included. In addition, terms including ordinal numbers, such as 'first' and 'second', used in the present invention can be used to describe various components, but the components should not be limited by the terms. The above terms are used only to discriminate one component from the other components. For example, a first component may be named a second component and similarly, the second component may also be named the first component, without departing from the scope of the present invention.

Hereinafter, preferable exemplary embodiment of the present invention will be described in more detail with reference to the accompanying drawings. Like reference numerals refer to like elements for easy overall understanding and a duplicated description of like elements will be omitted.

Further, in the following description, a detailed explanation of known related technologies may be omitted to avoid unnecessarily obscuring the subject matter of the present invention. Further, it is noted that the accompanying drawings are only for easily understanding the spirit of the present invention and it should not be interpreted that the spirit of the present invention is limited by the accompanying drawings.

FIG. 1 is a block diagram illustrating a configuration of a user equipment 100 according to an embodiment of the present invention.

As illustrated in FIG. 1, the user equipment 100 is constituted by a photographing unit 110, a communication unit 120, a storage unit 130, a display unit 140, an audio output unit 150, and a control unit 160. All the constituent elements of the user equipment 100 illustrated in FIG. 1 are not essential constituent elements, and the user equipment 100 may be implemented by more constituent elements than the constituent elements illustrated in FIG. 1 or less constituent elements therethan.

When an object recognition function is executed, the control unit 160 switches on the constituent elements for object recognition, such as the photographing unit 110, the communication unit 120, and the like. Then, the control unit 160 checks priorly received information. Herein, checking priorly received information includes acquiring image information photographed by the photographing unit 110, checking information included in a beacon signal transmitted from a beacon through the communication unit 120, or checking information included in tagging information of NFC tagging or RFID tagging through the communication unit 120. Then, the control unit recognizes an object according to the priorly received information as checked. That is, if the image information photographed by the photographing unit 110 is priorly acquired, the control unit 160 recognizes an object included in the image information, if the beacon signal transmitted from the beacon is priorly received by the communication unit 120, the control unit 160 checks information relevant to an object included in the beacon signal, and if the tagging information of NFC tagging or RFID tagging is priorly received by the communication unit 120, the control unit 160 checks information relevant to an object included in the tagging information. Then, the control unit 160 checks product information corresponding to the recognized object among product information for each object previously stored in the storage unit 130. Then, the control unit 160 displays the product information on the image information including the object and displayed on the display unit 140, or displays the product information on the other side where the beacon signal or tagging information is displayed. Further, the control unit 160 puts the checked product information in a preset shopping cart (or wish list), and displays a shopping cart screen (or wish list screen) including product information on the display unit 140 if a preset shopping cart item is selected. Then, if a preset purchase item is selected on the display unit 140, the control unit 160 executes a payment function with respect to a product corresponding to the product information by interworking with a payment server, and displays a payment function execution result on the display unit 140.

The user equipment 100 can be applied to various terminals such as smart phones, portable terminals, mobile terminals, personal digital assistants (PDA), PMP (Portable Multimedia Player) terminals, telematics terminals, navigation terminals, personal computers, notebook computers, slate PCs, tablet PCs, ultrabook, wearable devices (including, for example, smart watch, smart glass, HMD (Head Mounted Display), and the like.), Wibro terminals, IPTV (Internet Protocol Television) terminals, smart TVs, digital broadcasting terminals, televisions, 3D televisions, home theater systems, AVN (Audio Video Navigation) terminals, A/V (Audio/Video) systems, flexible terminals, and the like.

One or more photographing units 110 are provided on at least one side of the user equipment 100.

Further, the photographing unit 110 processes image frames such as a still image or a moving image obtained by an image sensor (a camera module or a camera) in a video phone mode, a photographing mode, and a video conference mode. That is, the photographing unit 110 encodes/decodes image data obtained by the image sensor so as to be matched with respective formats according to CODEC. The processed image frame is displayed on the display unit 140 by the control of the control unit 160. For example, the photographing unit 110 photographs an object (or a subject) (a user image or a video conferee), and outputs a video signal corresponding to the photographed image (subject image).

Further, the image frame processed by the photographing unit 110 may be stored in the storage unit 130 or transmitted to an external terminal (including any video conference terminal included in a video conference system) through the communication unit 120.

Further, a lens unit (not illustrated) for photographing an enlarged image may be further included at an upper part of the photographing unit 110.

Further, the photographing unit 110 photographs image information by the control of the control unit 160. In this case, the image information photographed by the photographing unit 110 may include an object.

That is, in order to execute the object recognition function, the photographing unit 110 photographs image information including an object by the control of the control unit 160.

The communication unit 120 communicates with any internal constituent element or at least any one external terminal via a wired/wireless communication network. In this case, the external terminal may include a beacon, a POS terminal (not illustrated), a payment server (not illustrated), a service providing device (not illustrated), and the like. Herein, a wireless internet technology may include wireless LAN (WLAN), DLNA (Digital Living Network Alliance), Wibro (Wireless Broadband), Wimax (World Interoperability for Microwave Access), HSDPA (High Speed Downlink Packet Access), HSUPA (High Speed Uplink Packet Access), IEEE 802.16, Long Term Evolution (LTE), LTE-A (Long Term Evolution-Advanced), Wireless Mobile Broadband Service (WMBS), and the like. The communication unit 120 transmits and receives data according to at least one wireless internet technology in a range including the internet technologies which are not described above. Further, a short range communication technology may include Bluetooth, RFID (Radio Frequency Identification), Infrared Data Association (IrDA), UWB (Ultra Wideband), ZigBee, Near Field Communication (NFC), Ultra Sound Communication (USC), Visible Light Communication (VLC), Wi-Fi, Wi-Fi Direct, and the like. Further, a wired communication technology may include Power Line Communication (PLC), USB communication, Ethernet, serial communication, hybrid fiber/coaxial cable, and the like.

Further, the communication unit may mutually transmit information with any terminal through a universal serial bus (USB).

Further, in order to execute the object recognition function, the communication unit 120 is switched from an OFF state (or an OFF mode) or a standby state (or a standby mode) to an ON state by the control of the control unit 160.

Further, the switched-on communication unit 120 receives a beacon signal transmitted from a beacon (not illustrated) adjacent to the user equipment 100 by the control of the control unit 160.

Further, the switched-on communication unit 120 receives tagging information from an NFC tag (not illustrated) adjacent to the user equipment 100 by NFC tagging on the NFC tag by the control of the control unit 160.

Further, the switched-on communication unit 120 receives tagging information from an RFID tag (not illustrated) adjacent to the user equipment 100 by tagging on the RFID tag by the control of the control unit 160.

The storage unit (or database) 130 stores various user interfaces (UI), graphic user interfaces (GUI), and the like therein.

Further, the storage unit 130 stores data and programs required to operate the user equipment 100.

That is, the storage unit 130 may store various application programs (or applications) to be executed in the user equipment 100 and data and instructions for operating the user equipment 100. At least some of the application programs can be downloaded from an external server through wireless communication. Meanwhile, the application programs may be stored in the storage unit 130, and installed in the user equipment 100, and driven by the control unit 160 so as to execute operations (or functions) of the user equipment 160.

Further, the storage unit 130 may include at least one storage medium of memories of flash memory type, hard disk type, multimedia card micro type, and card type memories (for example, a SD or XD memory), magnetic memories, magnetic disks, optical disks, RAM (Random Access Memory), SRAM (Static Random Access Memory), ROM (Read-Only Memory), EEPROM (Electrically Erasable Programmable Read-Only Memory), and PROM (Programmable Read-Only Memory). Further, the user equipment 100 may manage a web storage that executes a storage function of the storage unit 130 on the Internet, or may operate in association with the web storage.

Further, the storage unit 130 stores a plurality of recognition methods (or recognition means), product information for each object (or product information for each search word) therein by the control of the control unit 160. Herein, the plurality of recognition methods includes image recognition, text recognition, bar code recognition, QR code recognition, and the like. Further, the plurality of recognition methods may be prioritized in advance by the control of the control unit 160. Further, the product information may include a product name, a product identity code, a product image, a product specification, location information of a store that sells a corresponding product, a telephone number of the store, and location information of stores located within a preset radius (including, for example, 500 meters, 1 Km, and the like) of a location of the user equipment 100.

Further, the product information for each object stored in the storage unit 130 may be prioritized for importance in advance depending on a category which the object belongs to. That is, if the object is food, location information of a store may have the highest priority, if the object is a fashion (or clothing) item, price information may have the highest priority, and if the object is cosmetics, ingredient information about the cosmetics may have the highest priority.

The display unit 140 may display various contents such as various menu screens by using the UI and/or GUI stored in the storage unit 130 by the control of the control unit 160. Herein, the contents displayed on the display unit 140 may include menu screens including various texts or image data (including various information data) and data such as icons, a list menu, a combo box, and the like. Further, the display unit 140 may be a touch screen. Herein, the display unit 140 may include a touch sensor for sensing a touch gesture of a user. The touch sensor may be one of sensors of a capacitive type, a resistive type, and a piezoelectric type. In the case of the capacitive type, a dielectric substance coated on a surface of the touch screen is used to sense micro electricity excited as a user's body part touches the surface of the touch screen, and touch coordinates are calculated. In the case of the resistive type, two electrode plates are embedded in the touch screen, and when a user touches the screen, the upper and lower electrodes are brought into contact with each other at a touched point and a current flows, and a flow of the current is sensed and touch coordinates are calculated. In addition, the user equipment may support a pen input function. In this case, a user's gesture using an input means such as a pen instead of the user's body part can be sensed. For example, if the input means is a stylus pen including a coil therein, the user equipment may include a magnetic field sensor for sensing a magnetic field changed by the coil within the stylus pen. In this case, it is possible to sense not only a touch gesture of the user but also an approach gesture, such as hovering, of the user.

Further, the display unit 140 may be realized as at least one of a liquid crystal display (LCD), a thin film transistor-liquid crystal display (TFT-LCD), an organic light-emitting diode (OLED), a flexible display, a 3D display, an e-ink display, and a light emitting diode (LED), and may include a driving circuit, a backlight unit, and the like for realization thereof.

Further, the display unit 140 may be constituted as a stereoscopic display unit configured to display a stereoscopic image.

Three-dimensional display methods such as a stereoscopic method (glass type), an auto-stereoscopic method (glassless type), a projection method (holographic type), and the like may be applied to the stereoscopic display unit.

Further, the display unit 140 display image information photographed by the photographing unit 110, product information about an object included in the image information, product information about an object corresponding to a beacon signal received by the communication unit 120, product information about an object corresponding to tagging information received by the communication unit 120, and the like by the control of the control unit 160.

The audio output unit 150 outputs audio information included in a signal to which a predetermined signal process is performed by the control unit 160. Herein, the audio output unit 150 may include a receiver, a speaker, a buzzer, and the like.

Further, the audio output unit 150 outputs an audio guidance generated by the control unit 160.

Further, the audio output unit 150 outputs, by the control unit 160, audio information corresponding to each of product information about an object included in image information, product information about an object corresponding to a beacon signal received by the communication unit 120, and product information about an object corresponding to tagging information received by the communication unit 120.

The control unit 160 performs an overall control function for the user equipment 100.

Further, the control unit 160 performs the overall control function for the user equipment 100 by using programs and data stored in the storage unit 130. The control unit 160 may include a RAM, a ROM, a CPU, a GPU, and a bus, and the RAM, the ROM, the CPU, the GPU, and the like may be connected with each other by the bus. The CPU may access the storage unit 130 and perform booting by using an O/S stored in the storage unit 130 and perform various operations by using various programs, contents, data, and the like stored in the storage unit 130.

Further, if an app (for example, a camera app) previously installed in the user equipment is executed, the control unit 160 displays an app execution result screen on the display unit 140.

Further, in order to execute the object recognition function, the control unit 160 controls the photographing unit 110 to photograph image information including an object and displays the photographed image information on the display unit 140.

Further, in order to execute the object recognition function, the control unit 160 switches on the constituent elements for object recognition, such as the photographing unit 110, the communication unit 120, and the like.

Further, the control unit 160 checks information priorly received from the switched-on photographing unit 110 and communication unit 120.

That is, if the switched-on photographing unit 110 photographs image information including an object, the control unit 160 receives (or checks) the image information photographed by the photographing unit 110.

Further, if the switched-on communication unit 120 receives a beacon signal transmitted from a beacon (not illustrated) adjacent to the user equipment 100, the control unit 160 receives (or checks) the beacon signal transmitted from the beacon.

Further, if the switched-on communication unit 120 recognizes tagging information from an NFC tag (not illustrated) adjacent to the user equipment 100 by NFC tagging on the NFC tag, the control unit 160 checks (or recognizes) the tagging information of tagging on the NFC tag.

Further, if the switched-on communication unit 120 recognizes tagging information from an RFID tag (not illustrated) adjacent to the user equipment 100 by tagging on the RFID tag, the control unit 160 checks (or recognizes) the tagging information of tagging on the RFID tag.

Further, the control unit 160 analyzes a pattern included in image information photographed by the photographing unit 110.

That is, the control unit 160 analyzes an attribute of an object included in the image information by unit of pattern.

Further, the control unit determines (or selects/checks) one (or a plurality of) recognition method suitable for a pattern analysis result among a plurality of recognition methods previously stored in the storage unit 130 on the basis of the pattern analysis result. Herein, the plurality of recognition methods includes image recognition, text recognition (or Optical Character Reader recognition), bar code recognition, QR code recognition, and the like.

That is, the control unit 160 checks whether there is information for image analysis (or image recognition), text analysis (or text recognition), bar code analysis (or bar code recognition), and QR code analysis (or QR code recognition) among the pattern analysis result, and then determines (or selects/checks) a recognition method corresponding to the information for one or more analyses among the pattern analysis result.

Further, the control unit 160 may employ a deep learning technique that enables the user equipment 100 to self-determine the most desirable recognition method (or the most suitable recognition method) among the plurality of recognition methods stored in the storage unit 130 according to accumulated recognition process data and environmental information around the user equipment 100 sensed in real time upon recognition.

Further, the control unit 160 recognizes the object included in the image information photographed by the photographing unit 110 by the determined recognition method.

In this case, if a single recognition method is determined, the control unit 160 recognizes the object included in the image information photographed by the photographing unit 110 by the single determined recognition method.

Further, if a plurality of recognition methods is determined, the control unit recognizes the object included in the image information photographed by the photographing unit 110 by each of the plurality of determined recognition methods. Herein, the control unit 160 may execute the object recognition function by priorly using a recognition method with a relatively high recognition speed among the plurality of recognition methods.

Further, if a plurality of recognition methods is determined, the control unit 160 may execute the object recognition function by priorly using a recognition method with a high priority among the plurality of recognition methods on the basis of a preset order of priority.

Further, the control unit 160 may verify (or check) a result of the object recognition function executed by the recognition method with a high priority (or recognition method with a relatively high recognition speed) by using a recognition method with a relatively low priority (or recognition method with a relatively low recognition speed).

As such, the order of using the plurality of recognition methods may vary depending on technical efficiency.

Further, after a recognition result is derived by using a specific recognition method by the control unit 160, the derived recognition result may or may not be verified by using another recognition method.

Further, the control unit 160 recognizes an object included in the image information photographed by the photographing unit 110 by each of the plurality of recognition methods previously stored in the storage unit 130. Herein, the control unit 160 may perform the plurality of recognition methods in sequence or in parallel.

That is, the control unit 160 sequentially executes a function of recognizing an object included in the image information photographed by the photographing unit 110 on the basis of a preset order of priority (or process sequence) with respect to the plurality of recognition methods. In this case, if the object is recognized by using a specific recognition method, the control unit 160 does not execute the object recognition function by using a recognition method subsequent to the specific recognition method (or a recognition method with a priority subsequent to that of the specific recognition method).

Further, the control unit 160 executes a function of recognizing an object included in the image information photographed by the photographing unit 110 on the basis of the plurality of recognition methods in parallel at the same time. Then, the control unit 160 compares results of the object recognition function executed in parallel by using the plurality of recognition methods, and finally confirms (or derives) an object recognition result. In this case, if a single object is identified from the object recognition function results obtained by using the plurality of recognition methods, the control unit 160 confirms (or derives) the single recognized object as a recognition result. Further, if a plurality of objects is identified from the object recognition function results obtained by using the plurality of recognition methods, the control unit 160 may confirm, as a recognition result, an object according to an object recognition function result with the highest accuracy among the object recognition function results obtained by using the plurality of recognition methods, or confirm, as a recognition result, objects according to two object recognition function results with the highest accuracy among the object recognition function results obtained by using the plurality of recognition methods if the two object recognition function results are identical to each other by comparison.

As described above, the control unit 160 may provide a multi scanning solution in which an optimum recognition method for the image information including an object photographed by the photographing unit 110 is selected among the plurality of recognition methods (or recognition means) stored in the storage unit 130 and the object is recognized by using a previously selected recognition method or by using the plurality of recognition methods in sequence or in parallel.

Further, the control unit 160 recognizes an object on the basis of priorly received information.

That is, if image information photographed by the photographing unit 110 is priorly received, the control unit 160 analyzes an attribute of an object included in the image information photographed by the photographing unit 110 by unit of pattern, determines a single recognition method suitable for a pattern analysis result among the plurality of recognition methods previously stored in the storage unit 130 on the basis of the pattern analysis result, and recognizes the object included in the photographed image information by using the single determined recognition method or recognizes the object included in the photographed image information by performing the plurality of determined recognition methods in sequence or by performing the plurality of determined recognition methods in parallel.

Further, if a beacon signal transmitted from the beacon is received by the communication unit 120, the control unit 160 analyzes information included in the received beacon signal and identifies an object according to an analysis result.

Further, if tagging information of NFC tagging or RFID tagging is checked by the communication unit 120, the control unit 160 analyzes the tagging information and identifies an object according to an analysis result.

As described above, the control unit 160 may provide an all in one scanning/detecting solution in which execution of the recognition function using the photographing unit 110 and execution of the recognition function without using the photographing unit 110 (or receipt of a beacon signal or receipt of tagging information of NFC tagging by using the communication unit 120) are combined so as to enable all of cases to be realized.

Further, if the object included in the image information cannot be recognized by using the plurality of recognition methods previously stored in the storage unit 130, the control unit 160 outputs information indicative of a failure in object recognition through the display unit 140 and/or the audio output unit 150.

Further, the control unit 160 checks product information corresponding to the recognized object (or a product name/search word corresponding to the recognized object) among product information for each object (or product information for each search word) previously stored in the storage unit 130. Herein, the product information may include a product name, a product identity code, a product image, a product specification, location information of a store that sells a corresponding product, a telephone number of the store, and location information of stores located within a preset radius (including, for example, 500 meters, 1 Km, and the like) of a location of the user equipment 100. In this case, the control unit 160 may check real-time location information of the user equipment 100 through a GPS receiver (not illustrated) included in the user equipment 100.

Further, the product information for each object stored in the storage unit 130 may be prioritized for importance in advance depending on a category which the object belongs to. That is, if the object is food, location information of a store may have the highest priority, if the object is a fashion (or clothing) item, price information may have the highest priority, and if the object is cosmetics, ingredient information about the cosmetics may have the highest priority.

Further, if there is no product information corresponding to the recognized object among the product information previously stored in the storage unit 130, the control unit 160 may not display product information relevant to the recognized object on the display unit 140, or may output information indicating that there is no relevant product information through the display unit 140 and/or the audio output unit 150.

Further, if there is no product information corresponding to the recognized object among the product information previously stored in the storage unit 130, the control unit 160 transmits, through the communication unit 120, a request for product information relevant to the object to the service providing device (not illustrated).

Further, the control unit 160 receives, through the communication unit 120, product information relevant to the object transmitted from the service providing device in response to the transmitted request for product information relevant to the object.

Further, the control unit 160 displays the received product information relevant to the object on the display unit 140.

Further, the control unit 160 displays the previously checked product information on the display unit 140 on which the image information photographed by the photographing unit 110 is displayed, by using an augmented reality (AR) function or overlay function. In this case, the control unit 160 may display, on the display unit 140, only information with the highest priority among the product information for each object. Further, if the object is shifted (or moved) in the image information acquired by the photographing unit 110, the control unit 160 may control the product information to track the object so as to be displayed on the display unit 140.

Further, while displaying an object identified from an analysis result of the beacon signal on one side of the display unit 140, the control unit 160 displays product information previously checked using the augmented reality function or overlay function on the other side of the display unit 140.

Further, while displaying an object identified from an analysis result of the tagging information of NFC tagging or RFID tagging on one side of the display unit 140, the control unit 160 displays product information previously checked using the augmented reality function or overlay function on the other side of the display unit 140.

As such, it is possible to display an identified object and provide product information corresponding to the object at the same time.

Further, the control unit 160 puts (or adds) product information previously checked using the augmented reality function or overlay function in a preset shopping cart (or wish list) at the same time when the checked product information is displayed on the display unit 140 on which the image information is displayed.

Further, the control unit 160 puts (or adds) product information previously checked using the augmented reality function or overlay function in a preset shopping cart (or wish list) at the same time when the checked product information is displayed on the display unit 140 on which an object identified from an analysis result of the beacon signal or tagging information is displayed.

Further, if a preset shopping cart item (or shopping cart button) displayed on one side of the display unit 140 is selected, the control unit 160 displays a shopping cart screen (or wish list screen) including (or added with) product information on the display unit 140.

Further, if a preset purchase item (or purchase button) displayed on one side of the display unit 140 is selected, the control unit 160 executes a payment function with respect to the product corresponding to product information included in (added to) the shopping cart by interworking with the payment server (not illustrated).

Further, if the payment function is normally executed, the control unit 160 displays a payment function execution result (or payment information) provided from the payment server on the display unit 140. Herein, the payment information may include a product name, a product identity code, a product image, a product specification, location information of a store that sells the product, a telephone number of the store, order information, payment date and time information, price information for each ordered product, and the like.

As described above, the present invention can provide a shopping flow that enables all of processes including searching a product, gathering information, and putting and purchasing the product to be realized by one service during online/offline shopping.

Further, if there is a change in price or sale information about a product corresponding to the product information being put (or put) in the shopping cart item or a paid product, the control unit 160 outputs, through the display unit 140 and/or the audio output unit 150, information about the product (including, for example, price change information, sale information, and the like) in the form of a push message.

Further, if the information about the product provided in the form of a push message is selected, the control unit 160 may execute the payment function with respect to the product by interworking with the payment server.

Further, the user equipment 100 may further include an interface unit (not illustrated) that interfaces with all of external devices connected with the user equipment 100. For example, the interface unit may be constituted by a wired/wireless headset port, an external charger port, a wired/wireless data port, a memory card port, a port for connecting a device including an identification module, an audio I/O (Input/Output) port, a video I/O (Input/Output) port, an earphone port, and the like. Herein, the identification module is a chip that stores various information for authenticating the authority of the user equipment 100 and may include a user identity module (UIM), a subscriber identity module (SIM), and a universal subscriber identity module (USIM). The device including the identification module may be manufactured in the form of a smart card. Accordingly, the identification module may be connected with the user equipment 100 through a port. The interface unit receives data or power from an external device and then transfers the received data or power to each of the constituent elements within the user equipment 100, or enables data within the user equipment 100 to be transmitted to an external device.

Further, when the user equipment 100 is connected with an external cradle, the interface unit may serve as a passage for supplying power from the cradle to the user equipment 100 or may serve as a passage for transferring various instruction signals input from the cradle by a user to the user equipment 100. Each of the various instruction signals input from the cradle or the power may operate as a signal for enabling the user equipment 100 to recognize that it is correctly loaded in the cradle.

Further, the user equipment 100 may further include an input unit (not illustrated) configured to receive a signal generated by operating a button or selecting any function by the user or receive an instruction or control signal generated by manipulating a displayed screen by touch/scrolling.

The input unit is a means for receiving at least one of the user's instruction, selection, data, and information and may include numerous input keys and function keys for receiving numerical or text information and setting various functions.

Further, as the input unit, various devices such as a key pad, a dome switch, a touch pad (static/capacitive), a touch screen, a jog wheel, a jog switch, a jog shuttle, a mouse, a stylus pen, and a touch pen may be used. In particular, if the display unit 140 is formed into a touch screen, an input function may be executed, in part or in whole, by the display unit 140.

Further, each of the constituent elements (or modules) of the user equipment 100 may be software stored in a memory (or the storage unit 130) of the user equipment 100. The memory may be an embedded memory of the user equipment 100, an external memory, or a storage device of another type. Further, the memory may be a non-volatile memory. The software stored in the memory may include a set of instructions for controlling the user equipment 100 to perform a specific operation when executed.

Further, a processor installed in the user equipment 100 according to the present invention may process a program instruction for performing the method according to the present invention. In an embodiment, the processor may be a single-threaded processor. In another embodiment, the processor may be a multi-threaded processor. Further, the process can process instructions stored in the memory or storage device.

As described above, it is possible to sense an object as quickly as possible and provide information about the object to a user.

Further, as described above, it is possible to provide a plurality of recognition methods, such as image recognition, text recognition, bar code recognition, QR code recognition, receipt of information through a beacon, and recognition of information by NFC tagging, through a single solution.

Further, as described above, it is possible to provide a function of recognizing an object and putting a product corresponding to the recognized object in a shopping cart or a wish list at the same time.

Hereinafter, a control method of a user equipment for recognizing an object and displaying a database matching result according to the present invention will be described in detail with reference to FIG. 1 through FIG. 8.

Figure 2:
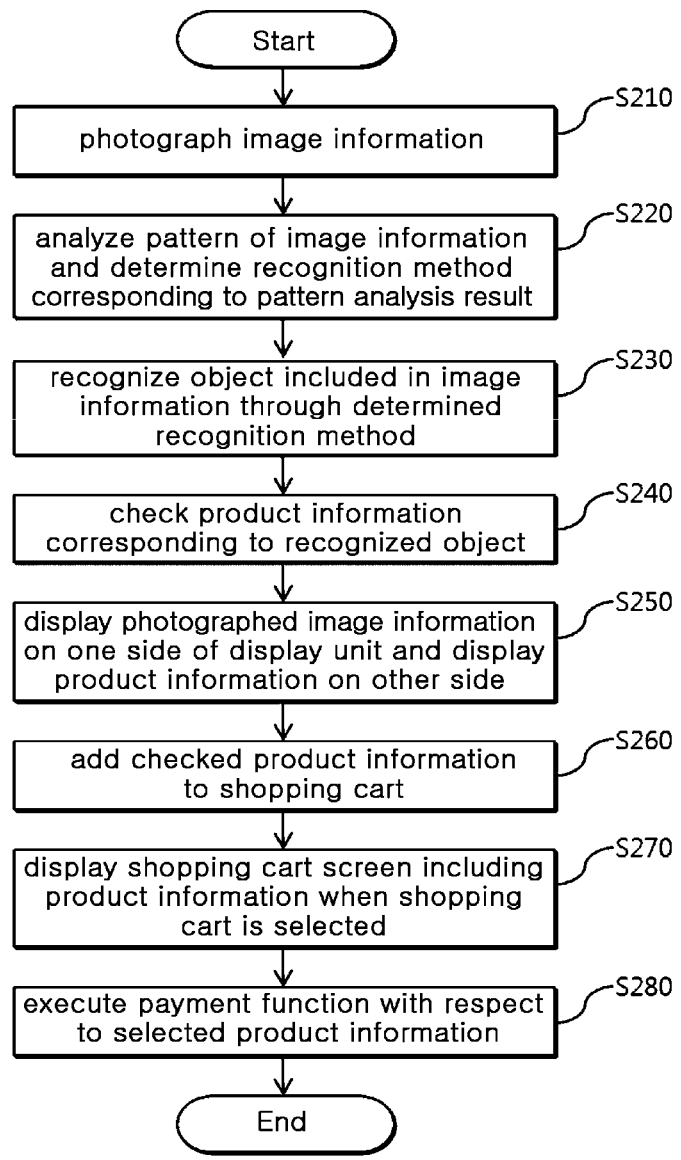
FIG. 2 is a flowchart illustrating a control method of a user equipment for recognizing an object and displaying a database matching result according to a first embodiment of the present invention.

FIG. 2 is a flowchart illustrating a control method of a user equipment for recognizing an object and displaying a database matching result according to a first embodiment of the present invention.

Firstly, in order to execute the object recognition function, the photographing unit 110 photographs image information including an object.

For example, when a camera app installed in the user equipment 100 is executed, the photographing unit 110 photographs image information including a first object displayed by the camera app (S210).

Then, the control unit 160 analyzes a pattern included in the image information photographed by the photographing unit 110.

That is, the control unit 160 analyzes an attribute of the object included in the image information by unit of pattern.

Further, the control unit 160 determines or selects/checks) one (or a plurality of) recognition method suitable for a pattern analysis result (or one/a plurality of recognition methods corresponding to the pattern analysis result) among a plurality of recognition methods (or recognition means) previously stored in the storage unit 130 on the basis of the pattern analysis result. Herein, the plurality of recognition methods includes image recognition, text recognition, bar code recognition, QR code recognition, and the like.

That is, the control unit 160 checks whether there is information for image analysis (or image recognition), text analysis (or text recognition), bar code analysis (or bar code recognition), and QR code analysis (or QR code recognition) among the pattern analysis result, and then determines (or selects/checks) a recognition method corresponding to the information for one or more analyses among the pattern analysis result.

In an example, the control unit 160 analyzes the pattern included in the image information photographed by the photographing unit 110, and if a bar code is included in the analyzed pattern (or pattern analysis result), the control unit 160 determines a bar code recognition method suitable for the pattern analysis result among the plurality of recognition methods previously stored in the storage unit 130.

In another example, the control unit 160 analyzes the pattern included in the image information photographed by the photographing unit 110, and if a bar code and an image pattern are included in the analyzed pattern (or pattern analysis result), the control unit 160 determines a bar code recognition method and an image recognition method suitable for the pattern analysis result among the plurality of recognition methods previously stored in the storage unit 130 (S220).

Then, the control unit 160 recognizes the object included in the image information photographed by the photographing unit 110 by the determined recognition method.

In this case, if a single recognition method is determined, the control unit 160 recognizes the object included in the image information photographed by the photographing unit 110 by the single determined recognition method.

Further, if a plurality of recognition methods is determined, the control unit recognizes the object included in the image information photographed by the photographing unit 110 by each of the plurality of determined recognition methods. Herein, the control unit 160 may execute the object recognition function by priorly using a recognition method with a relatively high recognition speed among the plurality of recognition methods.

Further, if a plurality of recognition methods is determined, the control unit 160 may execute the object recognition function by priorly using a recognition method with a high priority among the plurality of recognition methods on the basis of a preset order of priority.

Further, the control unit 160 may verify (or check) a result of the object recognition function executed by the recognition method with a high priority (or recognition method with a relatively high recognition speed) by using a recognition method with a relatively low priority (or recognition method with a relatively low recognition speed).

In an example, if a bar code recognition method as a single recognition method is determined, the control unit 160 recognizes the bar code included in the image information photographed by the photographing unit 110 on the basis of the determined bar code recognition method and identifies (or recognizes) cosmetics as the first objet corresponding to the recognized bar code.

In another example, if a bar code recognition method and an image recognition method as a plurality of recognition methods are determined, the control unit 160 recognizes cosmetics as the first object included in the image information photographed by the photographing unit 110 on the basis of the bar code recognition method with a high recognition speed (or an object recognition processing speed) among the determined bar code recognition method and image recognition method, and recognizes (or verifies) the cosmetics as the first object included in the image information photographed by the photographing unit 110 on the basis of the image recognition method with a subsequently high recognition speed (or a relatively low recognition speed as compared with the bar code recognition method) (S230).

Then, the control unit 160 checks product information corresponding to the recognized object (or a product name/search word corresponding to the recognized object) among product information for each object (or product information for each search word) previously stored in the storage unit 130. Herein, the product information may include a product name, a product identity code, a product image, a product specification, location information of a store that sells a corresponding product, a telephone number of the store, and location information of stores located within a preset radius (including, for example, 500 meters, 1 Km, and the like) of a location of the user equipment 100.

Further, the product information for each object stored in the storage unit 130 may be prioritized for importance in advance depending on a category which the object belongs to. That is, if the object is food, location information of a store may have the highest priority, if the object is a fashion (or clothing) item, price information may have the highest priority, and if the object is cosmetics, ingredient information about the cosmetics may have the highest priority.

For example, the control unit 160 checks product information corresponding to the cosmetics as the previously recognized first object among the product information for each object stored in the storage unit 130 (S240).

Then, the control unit 160 displays the previously checked product information on the display unit 140 on which the image information photographed by the photographing unit 110 is displayed, by using an augmented reality function or overlay function. In this case, the control unit 160 may display, on the display unit 140, only information with the highest priority among the product information for each object. Further, if the object is shifted (or moved) in the image information acquired by the photographing unit 110, the control unit 160 may control the product information to track the object so as to be displayed on the display unit 140.

Figure 3:
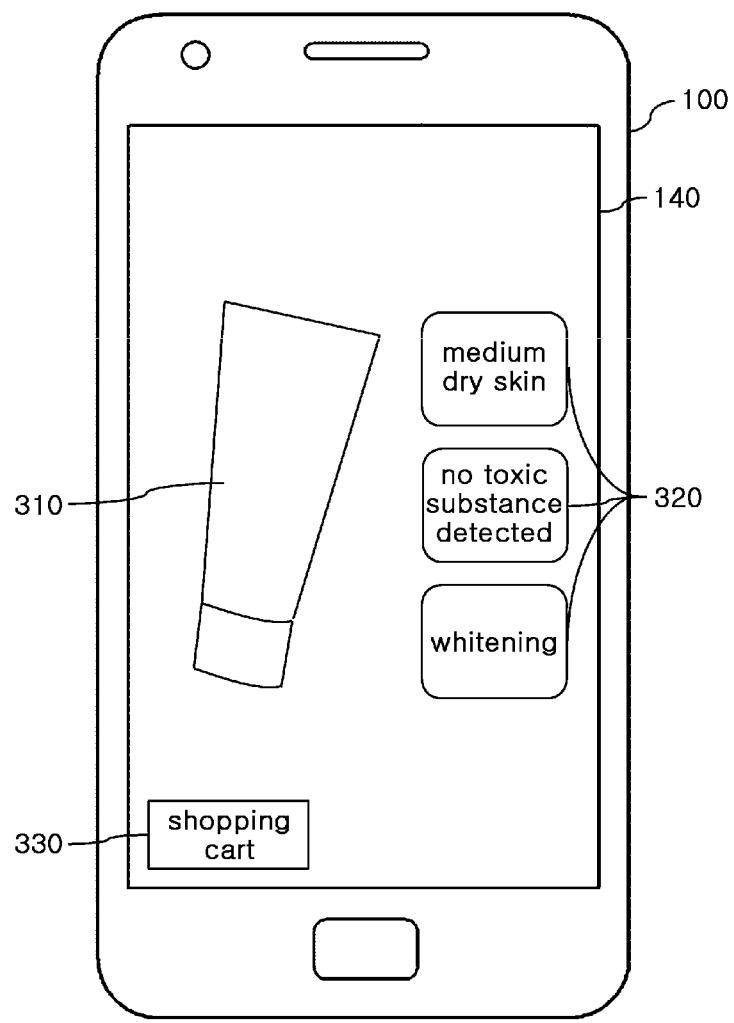
FIG. 3 is a diagram of a screen illustrating product information using an augmented reality function on image information including cosmetics as the first object, according to the first embodiment of the present invention

For example, as illustrated in FIG. 3, the control unit 160 displays product information 320 by using the augmented reality function on image information 310 including the cosmetics as the first object displayed on the display unit 140 (S250).

Further, the control unit 160 puts (or adds) product information previously checked using the augmented reality function or overlay function in a preset shopping cart (or wish list) at the same time when the checked product information is displayed on the display unit 140 on which the image information is displayed.

As such, by executing a function of automatically putting the checked product information in the shopping cart (or wish list), it is possible to reduce one of the user's actions and thus improve convenience in use (S260).

Then, if a preset shopping cart item (or shopping cart button) displayed on one side of the display unit 140 is selected, the control unit 160 displays a shopping cart screen (or wish list screen) including (or added with) product information on the display unit 140.

Figure 4:
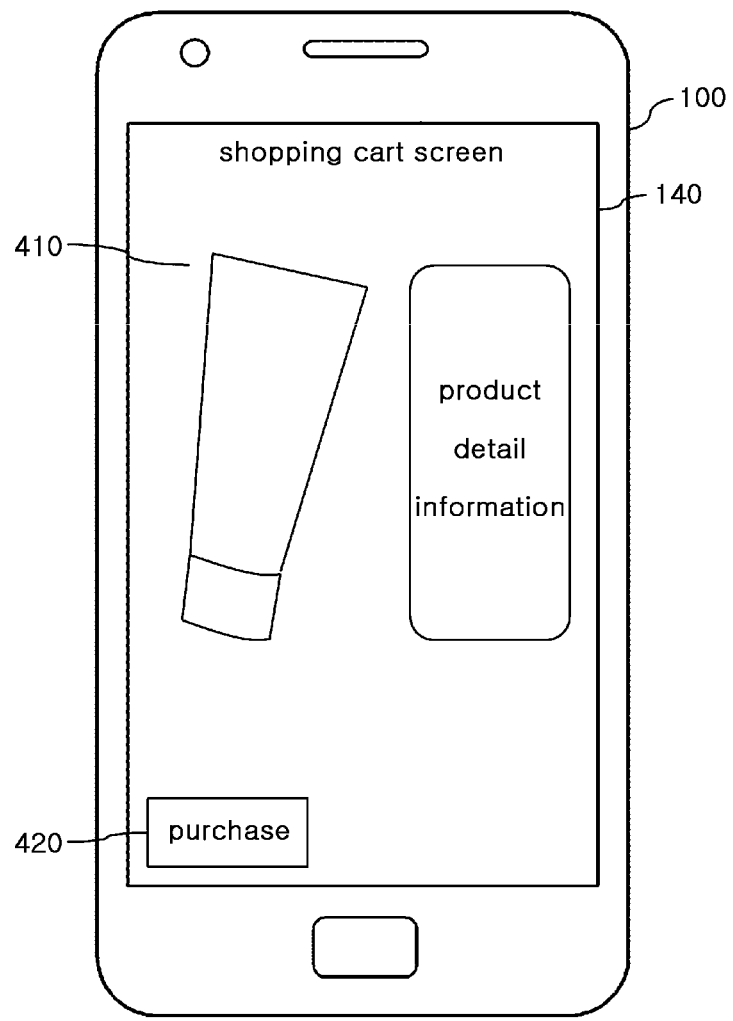
FIG. 4 is a diagram illustrating a shopping cart screen including product information about the cosmetics as the recognized first object, according to the first embodiment of the present invention.

For example, if a shopping cart button 330 displayed on one side of the display unit 140 illustrated in FIG. 3 is selected, the control unit 160 displays a shopping cart screen 410 including product information about the cosmetics as the recognized first object on the display unit 140 as illustrated in FIG. 4 (S270).

Then, if a preset purchase item (or purchase button) displayed on one side of the display unit 140 is selected, the control unit 160 executes a payment function with respect to the product corresponding to product information included in the shopping cart by interworking with the payment server (not illustrated).

Further, if the payment function is normally executed, the control unit 160 displays a payment function execution result (or payment information) provided from the payment server on the display unit 140. Herein, the payment information may include a product name, a product identity code, a product image, a product specification, location information of a store that sells the product, a telephone number of the store, order information, payment date and time information, price information for each ordered product, and the like.

Figure 5:
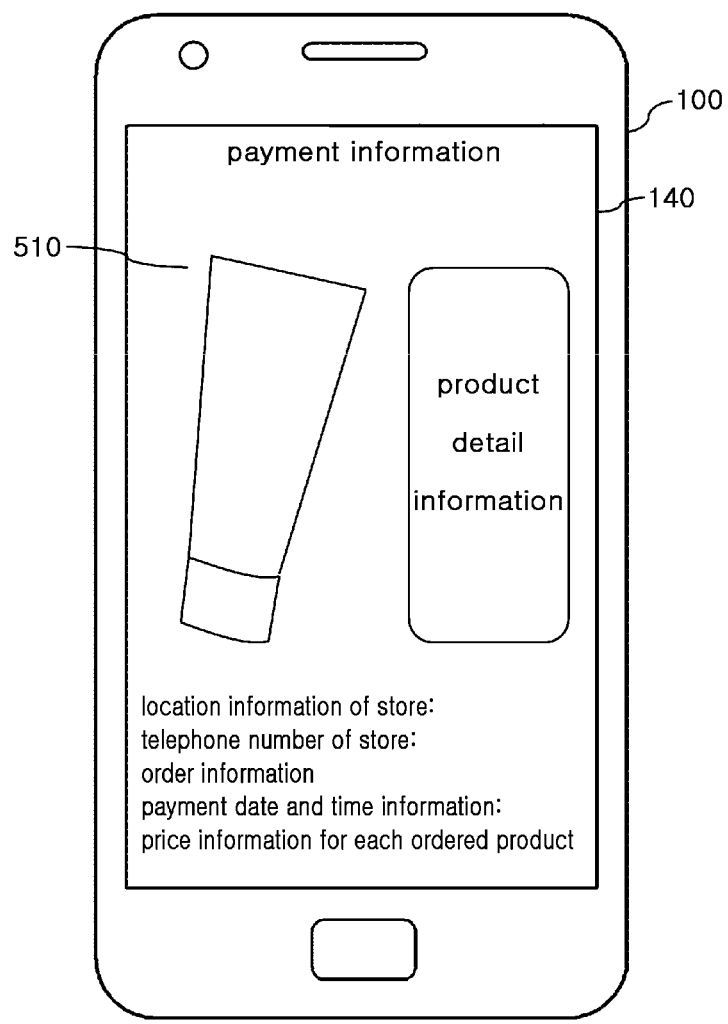
FIG. 5 is a diagram illustrating a payment function execution result on a display unit, according to the first embodiment of the present invention.

For example, if a purchase button illustrated in FIG. 4 is selected, the control unit 160 executes a payment function with respect to the cosmetics as the first object by interworking with the payment server, and displays a payment function execution result 510 on the display unit 140 as illustrated in FIG. 5 (S280).

As described above, the user equipment 100 may provide a multi scanning solution in which an optimum recognition method for the image information including the object photographed by the photographing unit 110 is selected among the plurality of recognition methods (or recognition means) stored in the storage unit 130 and the object is recognized by using the selected recognition method.

Figure 6:
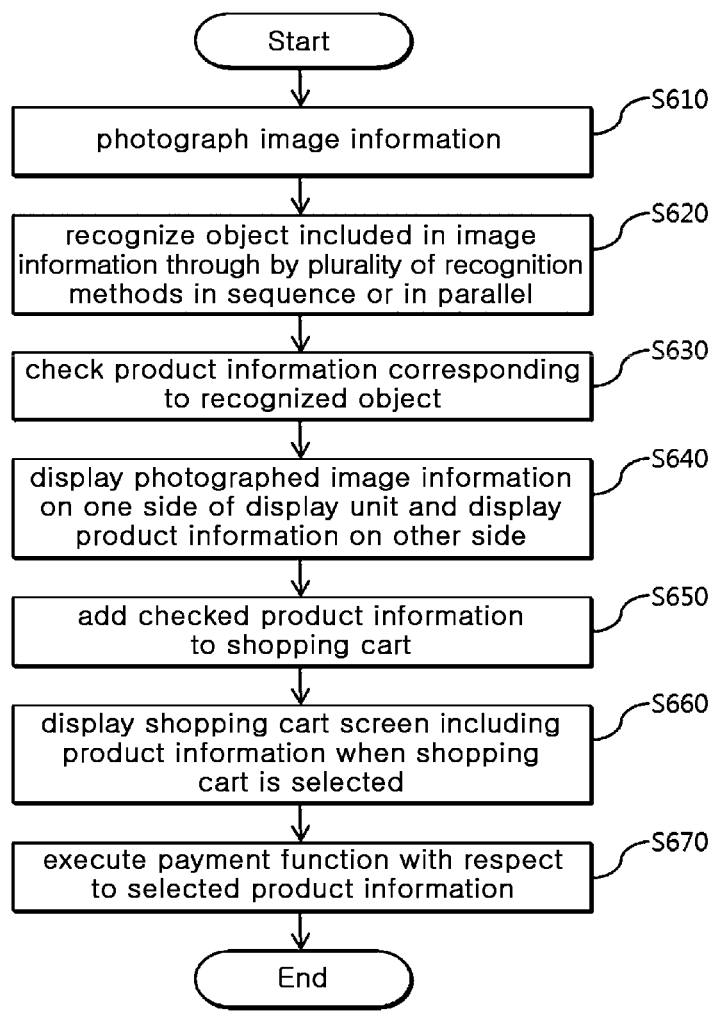
FIG. 6 is a flowchart illustrating a control method of a user equipment for recognizing an object and displaying a database matching result according to a second embodiment of the present invention.

FIG. 6 is a flowchart illustrating a control method of a user equipment for recognizing an object and displaying a database matching result according to a second embodiment of the present invention.

Firstly, in order to execute the object recognition function, the photographing unit 110 photographs image information including an object.

For example, when a camera app installed in the user equipment 100 is executed, the photographing unit 110 photographs image information including a first object displayed by the camera app (S610).

Then, the control unit 160 recognizes an object included in the image information photographed by the photographing unit 110 by each of the plurality of recognition methods previously stored in the storage unit 130. Herein, the control unit 160 may perform the plurality of recognition methods in sequence or in parallel.

That is, the control unit 160 sequentially executes a function of recognizing an object included in the image information photographed by the photographing unit 110 on the basis of a preset order of priority (or process sequence) with respect to the plurality of recognition methods. In this case, if the object is recognized by using a specific recognition method, the control unit 160 does not execute the object recognition function by using a recognition method subsequent to the specific recognition method (or a recognition method with a priority subsequent to that of the specific recognition method).

Further, the control unit 160 executes a function of recognizing an object included in the image information photographed by the photographing unit 110 on the basis of the plurality of recognition methods in parallel at the same time. Then, the control unit 160 compares results of the object recognition function executed in parallel by using the plurality of recognition methods, and finally confirms (or derives) an object recognition result. In this case, if a single object is identified from the object recognition function results obtained by using the plurality of recognition methods, the control unit 160 confirms (or derives) the single recognized object as a recognition result. Further, if a plurality of objects is identified from the object recognition function results obtained by using the plurality of recognition methods, the control unit 160 may confirm, as a recognition result, an object according to an object recognition function result with the highest accuracy among the object recognition function results obtained by using the plurality of recognition methods, or confirm, as a recognition result, objects according to two object recognition function results with the highest accuracy among the object recognition function results obtained by using the plurality of recognition methods if the two object recognition function results are identical to each other by comparison.

In an example, the control unit 160 recognizes the first object included in the image information photographed by the photographing unit 110 by sequentially using an image recognition method with a first priority, a text recognition method with a second priority, a bar code recognition method with a third priority, and a QR code recognition method with a fourth priority among the plurality of recognition methods. In this case, when the first object included in the image information photographed by the photographing unit 110 is recognized by using the text recognition method with a second priority, the control unit 160 skips the bar code recognition method and the QR code recognition method with lower priorities.

In another example, the control unit 160 recognizes the first object included in the image information photographed by the photographing unit 110 by using a plurality of recognition methods including the image recognition method, the text recognition method, the bar code recognition method, and the QR code recognition method in parallel. Further, the control unit 160 finally recognizes the first object included in the image information on the basis of recognition results obtained by using the plurality of recognition methods (S620).

Then, the control unit 160 checks product information corresponding to the recognized object (or a product name/search word corresponding to the recognized object) among product information for each object (or product information for each search word) previously stored in the storage unit 130. Herein, the product information may include a product name, a product identity code, a product image, a product specification, location information of a store that sells a corresponding product, a telephone number of the store, and location information of stores located within a preset radius (including, for example, 500 meters, 1 Km, and the like) of a location of the user equipment 100.

Further, the product information for each object stored in the storage unit 130 may be prioritized for importance in advance depending on a category which the object belongs to. That is, if the object is food, location information of a store may have the highest priority, if the object is a fashion (or clothing) item, price information may have the highest priority, and if the object is cosmetics, ingredient information about the cosmetics may have the highest priority.

For example, the control unit 160 checks product information corresponding to the cosmetics as the previously recognized first object among the product information for each object stored in the storage unit 130 (S630).

Then, the control unit 160 displays the previously checked product information on the display unit 140 on which the image information photographed by the photographing unit 110 is displayed, by using an augmented reality function or overlay function. In this case, the control unit 160 may display, on the display unit 140, only information with the highest priority among the product information for each object. Further, if the object is shifted (or moved) in the image information acquired by the photographing unit 110, the control unit 160 may control the product information to track the object so as to be displayed on the display unit 140.

For example, as illustrated in FIG. 3, the control unit displays product information 320 by using the augmented reality function on image information 30 including the cosmetics as the first object displayed on the display unit 140 (S640).

Further, the control unit 160 puts (or adds) product information previously checked using the augmented reality function or overlay function in a preset shopping cart (or wish list) at the same time when the checked product information is displayed on the display unit 140 on which the image information is displayed.

As such, by executing a function of automatically putting the checked product information in the shopping cart (or wish list), it is possible to reduce one of the user's actions and thus improve convenience in use (S650).

Then, if a preset shopping cart item (or shopping cart button) displayed on one side of the display unit 140 is selected, the control unit 160 displays a shopping cart screen including product information on the display unit 140.

For example, if the shopping cart button 330 displayed on one side of the display unit 140 illustrated in FIG. 3 is selected, the control unit 160 displays the shopping cart screen 410 including product information about the cosmetics as the recognized first object on the display unit 140 as illustrated in FIG. 4 (S660).

Then, if a preset purchase item (or purchase button) displayed on one side of the display unit 140 is selected, the control unit 160 executes a payment function with respect to the product corresponding to product information included in the shopping cart by interworking with the payment server (not illustrated).

Further, if the payment function is normally executed, the control unit 160 displays a payment function execution result (or payment information) provided from the payment server on the display unit 140. Herein, the payment information may include a product name, a product identity code, a product image, a product specification, location information of a store that sells the product, a telephone number of the store, order information, payment date and time information, price information for each ordered product, and the like.

For example, if a purchase button illustrated in FIG. 4 is selected, the control unit 160 executes a payment function with respect to the cosmetics as the first object by interworking with the payment server, and displays the payment function execution result 510 on the display unit 140 as illustrated in FIG. 5 (S670).

As described above, the user equipment 100 may provide a multi scanning solution in which a plurality of recognition methods (or recognition means) stored in the storage unit 130 is applied in sequence or in parallel to the image information including the object photographed by the photographing unit 110 so as to recognize the object.

Figure 7:
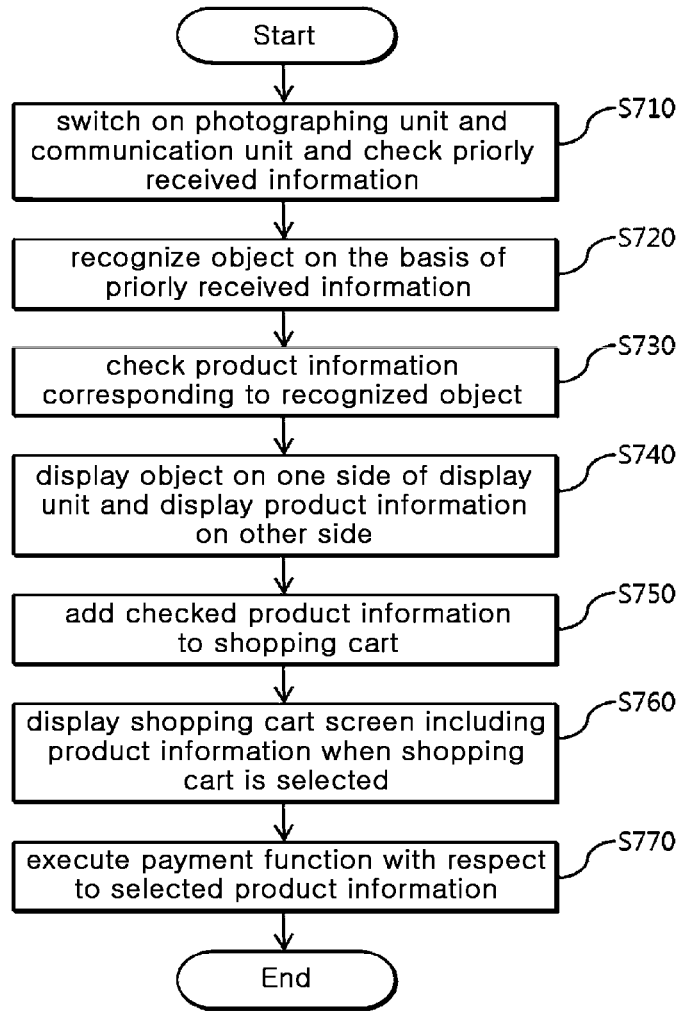
FIG. 7 is a flowchart illustrating a control method of a user equipment for recognizing an object and displaying a database matching result according to a third embodiment of the present invention.

FIG. 7 is a flowchart illustrating a control method of a user equipment for recognizing an object and displaying a database matching result according to a third embodiment of the present invention.

Firstly, in order to execute the object recognition function, the control unit 160 switches on the constituent elements for object recognition, such as the photographing unit 110, the communication unit 120, and the like.

Further, the control unit 160 checks information priorly received from the switched-on photographing unit 110 and communication unit 120.

That is, if the switched-on photographing unit 110 photographs image information including an object, the control unit 160 receives (or checks) the image information photographed by the photographing unit 110.

Further, if the switched-on communication unit 120 receives a beacon signal transmitted from a beacon (not illustrated) adjacent to the user equipment 100, if the switched-on communication unit 120 recognizes tagging information from an NFC tag (not illustrated) adjacent to the user equipment 100 by NFC tagging on the NFC tag, and if the switched-on communication unit 120 recognizes tagging information from an RFID tag (not illustrated) adjacent to the user equipment 100 by tagging on the RFID tag, the control unit 160 identifies the beacon signal transmitted from the beacon or identifies (or recognizes) the tagging information.

In an example, when an object recognition app previously installed in the user equipment 100 is executed, the control unit 160 switches on the photographing unit 110 and the communication unit 120 and receives image information photographed by the photographing unit 110.

In another example, when the object recognition app previously installed in the user equipment 100 is executed, the control unit 160 switches on the photographing unit 110 and the communication unit 120 and receives a beacon signal transmitted from a beacon adjacent to the user equipment 100 through the communication unit 120.

Otherwise, instead of checking information priorly received from the switched-on photographing unit 110 and communication unit 120, the control unit 160 may check information from the photographing unit 110 or the communication unit 120 selected by a user among the switched-on photographing unit 110 and communication unit 120.

In yet another example, when the object recognition app previously installed in the user equipment 100 is executed, the control unit 160 switches on the photographing unit 110 and the communication unit 120 and tags an NFC tag adjacent to the user equipment 100 through the communication unit 120 corresponding to the user's selection and checks tagging information (S710).

Then, the control unit recognizes (or identifies) the object on the basis of the priorly received information.

That is, if image information photographed by the photographing unit 110 is priorly received, the control unit 160 analyzes an attribute of an object included in the image information photographed by the photographing unit 110 by unit of pattern, determines a single recognition method suitable for a pattern analysis result among the plurality of recognition methods previously stored in the storage unit 130 on the basis of the pattern analysis result, and recognizes the object included in the photographed image information by using the single determined recognition method or recognizes the object included in the photographed image information by performing the plurality of determined recognition methods in sequence or by performing the plurality of determined recognition methods in parallel.

Further, if a beacon signal transmitted from the beacon is received by the communication unit 120, the control unit 160 analyzes information included in the received beacon signal and identifies an object according to an analysis result.

Further, if tagging information of NFC tagging or RFID tagging is checked by the communication unit 120, the control unit 160 analyzes the tagging information and identifies an object according to an analysis result.

In an example, image information photographed by the photographing unit 110 is priorly received, the control unit 160 analyzes a pattern included in the image information photographed by the photographing unit 110. Then, when a bar code is included in the analyzed pattern (or pattern analysis result), the control unit 160 determines a bar code recognition method suitable for the pattern analysis result among the plurality of recognition methods previously stored in the storage unit 130 and recognizes a first object included in the image information photographed by the photographing unit 110 by using the determined bar code recognition method.

In another example, when a beacon signal transmitted from the beacon is received by the communication unit 120, the control unit 160 analyzes information included in the received beacon signal and identifies the first object according to an analysis result.

In yet another example, when tagging information of NFC tagging is checked by the communication unit 120, the control unit 160 analyzes the tagging information and identifies the first object according to an analysis result (S720).

Then, the control unit 160 checks product information corresponding to the recognized object (or a product name/search word corresponding to the recognized object) among product information for each object (or product information for each search word) previously stored in the storage unit 130. Herein, the product information may include a product name, a product identity code, a product image, a product specification, location information of a store that sells a corresponding product, a telephone number of the store, and location information of stores located within a preset radius (including, for example, 500 meters, 1 Km, and the like) of a location of the user equipment 100.

Further, the product information for each object stored in the storage unit 130 may be prioritized for importance in advance depending on a category which the object belongs to. That is, if the object is food, location information of a store may have the highest priority, if the object is a fashion (or clothing) item, price information may have the highest priority, and if the object is cosmetics, ingredient information about the cosmetics may have the highest priority.

For example, the control unit 160 checks product information corresponding to the cosmetics as the previously recognized first object among the product information for each object previously stored in the storage unit 130 (S730).

Then, while the object identified from the analysis result of the beacon signal, the object identified from the analysis result of the tagging information, the image information photographed by the photographing unit 110, and the like are displayed on the display unit 140, the control unit 160 displays the previously checked product information on the other side of the display unit 140 or on the object of the display unit 140 by using an augmented reality function or overlay function. In this case, the control unit 160 may display, on the display unit 140, only information with the highest priority among the product information for each object. Further, if the object is shifted (or moved) in the image information acquired by the photographing unit 110, the control unit 160 may control the product information to track the object so as to be displayed on the display unit 140.

For example, as illustrated in FIG. 3, the control unit displays the product information 320 by using the augmented reality function on the image information 310 including the cosmetics as the first object displayed on the display unit 140.

Figure 8:
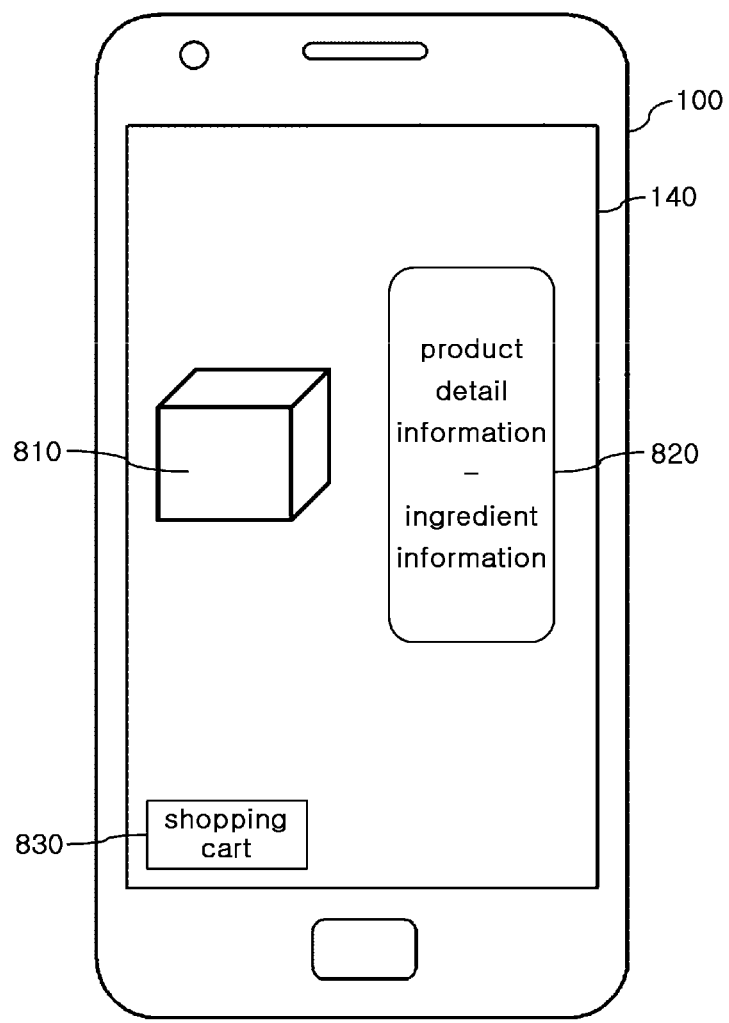
FIG. 8 is a diagram illustrating a screen of a display unit according to the embodiment of the present invention.

For example, as illustrated in FIG. 8, the control unit 160 displays, on one side of the display unit 140, an image 810 corresponding to soap as a second object identified from the analysis result of the tagging information of NFC tagging, and displays, on the other side of the display unit 140, product information (for example, ingredient information) 820 corresponding to the soap (S740).

Further, the control unit 160 puts (or adds) product information previously checked using the augmented reality function or overlay function in a preset shopping cart (or wish list) at the same time when the checked product information is displayed on the display unit 140 on which the object or the image information is displayed.

As such, by executing a function of automatically putting the checked product information in the shopping cart (or wish list), it is possible to reduce one of the user's actions and thus improve convenience in use (S750).

Then, if a preset shopping cart item (or shopping cart button) displayed on one side of the display unit 140 is selected, the control unit 160 displays a shopping cart screen including product information on the display unit 140.

For example, if the shopping cart button 330 displayed on one side of the display unit 140 illustrated in FIG. 3 is selected, the control unit 160 displays the shopping cart screen 410 including product information about the cosmetics as the recognized first object on the display unit 140 as illustrated in FIG. 4 (S760).

Then, if a preset purchase item (or purchase button) displayed on one side of the display unit 140 is selected, the control unit 160 executes a payment function with respect to the product corresponding to product information included in the shopping cart by interworking with the payment server (not illustrated).

Further, if the payment function is normally executed, the control unit 160 displays a payment function execution result (or payment information) provided from the payment server on the display unit 140. Herein, the payment information may include a product name, a product identity code, a product image, a product specification, location information of a store that sells the product, a telephone number of the store, order information, payment date and time information, price information for each ordered product, and the like.

For example, if a purchase button illustrated in FIG. 4 is selected, the control unit 160 executes a payment function with respect to the cosmetics as the first object by interworking with the payment server, and displays the payment function execution result 510 on the display unit 140 as illustrated in FIG. 5 (S770).

As described above, the user equipment 100 may provide an all in one scanning/detecting solution in which execution of the recognition function using the photographing unit 110 and execution of the recognition function without using the photographing unit 110 (or receipt of a beacon signal or receipt of tagging information of NFC tagging by using the communication unit 120) are combined so as to enable all of cases to be realized.

The user equipment for recognizing an object and displaying a database matching result according to the embodiment of the present invention may be prepared with a computer program, and codes and code segments configuring the computer program may be easily deduced by a computer programmer in the art. Further, the corresponding computer program is stored in non-transitory computer readable storage media, and read and executed by the computer or the user equipment according to the embodiment of the present invention to implement the user equipment for recognizing an object and displaying a database matching result.

The non-transitory computer readable storage media include a magnetic storage medium, an optical storage medium, and a carrier wave medium. The computer program implementing the user equipment for recognizing an object and displaying a database matching result according to the embodiment of the present invention may be stored and installed in an embedded memory of the user equipment and the like. Alternatively, an external memory such as a smart card storing and installing the computer program implementing the user equipment for recognizing an object and displaying a database matching result according to the embodiment of the present invention may be installed on the user equipment and the like through an interface.

In the embodiment of the present invention, as described above, it is possible to provide assistance on a purchase decision-making of a user by sensing an object as quickly as possible and providing information about the object to the user, and also possible to improve convenience of the user through integrated UX.

Further, in the embodiment of the present invention, as described above, it is possible to simply and quickly recognize an object by a recognition method optimized for a specific object by providing a plurality of recognition methods, such as image recognition, text recognition, bar code recognition, QR code recognition, receipt of information through a beacon, and recognition of information by NFC tagging, through a single solution, and thus possible to improve satisfaction of a user.

Further, the embodiment of the present invention, as described above, it is possible to provide a seamless shopping experience from recognition to result checking and purchase by recognizing an object and putting a product corresponding to the recognized object in a shopping cart or a wish list at the same time, and thus possible to improve convenience of a user.

Hereinabove, although the present invention is described by specific matters such as concrete components, and the like, embodiments, and drawings, they are provided only for assisting in the entire understanding of the present invention. Therefore, the present invention is not limited to the embodiments. Various modifications and changes may be made by those skilled in the art to which the present invention pertains from this description. Therefore, the spirit of the present invention should not be limited to the above-described embodiments and the following claims as well as all modified equally or equivalently to the claims are intended to fall within the scope and spirit of the invention.

INDUSTRIAL APPLICABILITY

The present invention provides assistance on a purchase decision-making of a user by sensing an object as quickly as possible and providing information about the object to the user, and also possible to improve convenience of the user through integrated UX. Accordingly, the present invention may be widely used in a payment field, a user equipment field, a payment server field, and the like.

EXPLANATION OF CODES

100: User equipment
110: Photographing unit
120: Communication unit
130: Storage unit
140: Display unit
150: Audio output unit
160: Control unit

What is claimed is:
1. A user equipment comprising:
a storage unit configured to store a plurality of recognition methods for recognizing an object and product information for the object;
a photographing unit configured to be switched on by the control of a control unit when an object recognition function is executed, and photographs image information;
a communication unit configured to be switched on by the control of the control unit, and also configured to receive a beacon signal transmitted from a beacon adjacent to the user equipment, checking first tagging information by NFC tagging on an NFC tag adjacent to the user equipment, or checking second tagging information by tagging on an RFID tag adjacent to the user equipment;
the control unit configured to check information received from the photographing unit and the communication unit which are switched on, recognize the object based on the received information, check product information corresponding to the recognized object among the product information for each object previously stored in the storage unit, and add the checked product information to a preset shopping cart or wish list; and a display unit configured to display one of the image information photographed by the photographing unit, an object recognized according to an analysis result of the beacon signal, an object recognized by analyzing the first tagging information, and an object recognized by analyzing the second tagging information on one side, and display product information corresponding to the recognized object on the other side, wherein the display unit displays product information corresponding to the recognized object by using an augmented reality (AR) function or overlay function by the control of the control unit, and displays only information with a preset highest priority among information included in the product information.

2. The user equipment of claim 1, wherein the received information is any one of the image information photographed by the photographing unit, the beacon signal received through the communication unit, the first tagging information checked by the communication unit by NFC tagging, and the second tagging information checked by the communication unit by RFID tagging.

3. The user equipment of claim 1, wherein when the image information photographed by the photographing unit is received, the control unit analyzes an attribute of an object included in the image information by unit of pattern, determines a single or a plurality of recognition methods corresponding to a pattern analysis result among the plurality of recognition methods stored in the storage unit on the basis of the pattern analysis result, and recognizes the object included in the image information on the basis of the single determined recognition method or recognizes the object included in the image information by performing the plurality of determined recognition methods in sequence or recognizes the object included in the image information by performing the plurality of determined recognition methods in parallel.

4. The user equipment of claim 1, wherein when the beacon signal transmitted from the beacon is received by means of the communication unit, the control unit analyzes information included in the beacon signal and identifies an object according to an analysis result.

5. The user equipment of claim 1, wherein when the first tagging information of NFC tagging or second tagging information of RFID tagging is received by means of the communication unit, the control unit analyzes the first tagging information or the second tagging information and identifies an object according to an analysis result.

6. The user equipment of claim 1, wherein the product information includes at least one of a product name, a product identity code, a product image, a product specification, location information of a store that sells a corresponding product, a telephone number of the store, and location information of stores located within a preset radius of a location of the user equipment.

7. A control method of a user equipment comprising:
switching on a photographing unit and a communication unit by the control of a control unit when an object recognition function is executed;
recognizing, by means of the control unit, an object on the basis of received information among image information photographed by the photographing unit, a beacon signal received by the communication unit, first tagging information of NFC tagging checked by the communication unit, and second tagging information of RFID tagging checked by the communication unit;
checking, by means of the control unit, product information corresponding to the recognized object among product information for each object previously stored in a storage unit and adding the checked product information to a preset shopping cart or wish list; and
displaying, by means of a display unit, one of the image information photographed by the photographing unit, an object recognized according to an analysis result of the beacon signal, an object recognized by analyzing the first tagging information, and an object recognized by analyzing the second tagging information on one side, and displaying product information corresponding to the recognized object on the other side by using an augmented reality (AR) function or overlay function and displaying only information with a preset highest priority among information included in the product information.

8. The control method of a user equipment of claim 7, further comprising:
displaying, by means of the display unit, a shopping cart screen or a wish list screen to which the product information is added when a preset shopping cart item or wish list item displayed on the display unit is selected;
executing, by means of the control unit, a payment function with respect to the product corresponding to product information added to the shopping cart screen or the wish list screen by interworking with a payment server when a preset purchase button displayed on the display unit is selected; and
displaying, by means of the display unit, a payment function execution result.

9. A non-transitory computer readable storage medium storing a computer program comprising a set of instructions, when executed, arranged to cause a user equipment to perform operations comprising:
switching on a photographing unit and a communication unit by the control of a control unit when an object recognition function is executed;
recognizing, by means of the control unit, an object on the basis of received information among image information photographed by the photographing unit, a beacon signal received by the communication unit, first tagging information of NFC tagging checked by the communication unit, and second tagging information of RFID tagging checked by the communication unit;
checking, by means of the control unit, product information corresponding to the recognized object among product information for each object previously stored in a storage unit and adding the checked product information to a preset shopping cart or wish list; and
displaying, by means of a display unit, one of the image information photographed by the photographing unit, an object recognized according to an analysis result of the beacon signal, an object recognized by analyzing the first tagging information, and an object recognized by analyzing the second tagging information on one side, and display product information corresponding to the recognized object on the other side by using an augmented reality (AR) function or overlay function and displaying only information with a preset highest priority among information included in the product information.

10. A non-transitory computer readable storage medium of claim 9, the operations further comprising:
displaying, by means of the display unit, a shopping cart screen or a wish list screen to which the product information is added when a preset shopping cart item or wish list item displayed on the display unit is selected;

executing, by means of the control unit, a payment function with respect to the product corresponding to product information added to the shopping cart screen or the wish list screen by interworking with a payment server when a preset purchase button displayed on the display unit is selected; and displaying, by means of the display unit, a payment function execution result.

\* \* \* \* \*